April 22, 1924.
S. MUNSON
BEARING HOUSING
Filed Sept. 14, 1920    2 Sheets-Sheet 1
1,491,721
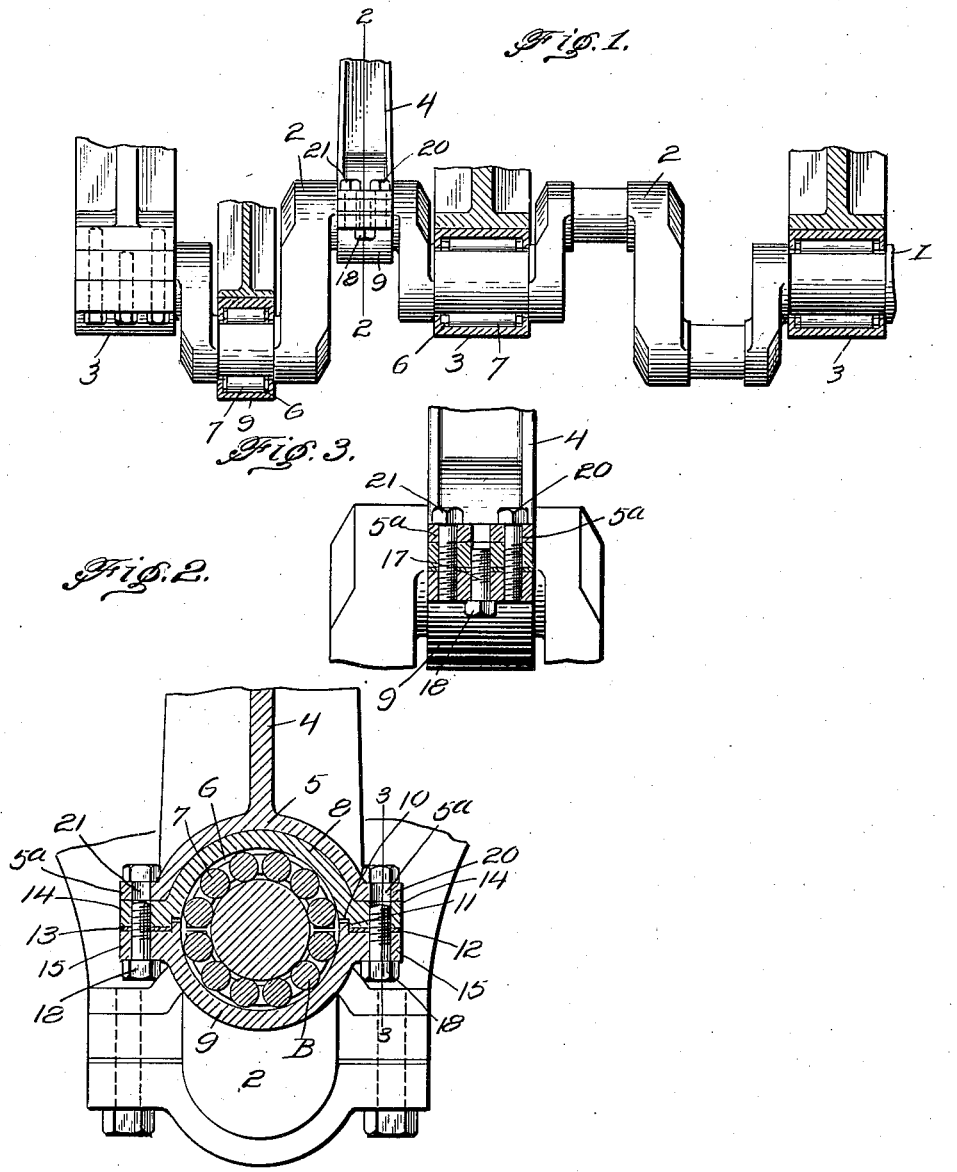
Sweney Munson. INVENTOR.
BY Geo. P. Kimmel ATTORNEY.

April 22, 1924.
S. MUNSON
BEARING HOUSING
Filed Sept. 14, 1920  2 Sheets-Sheet 2
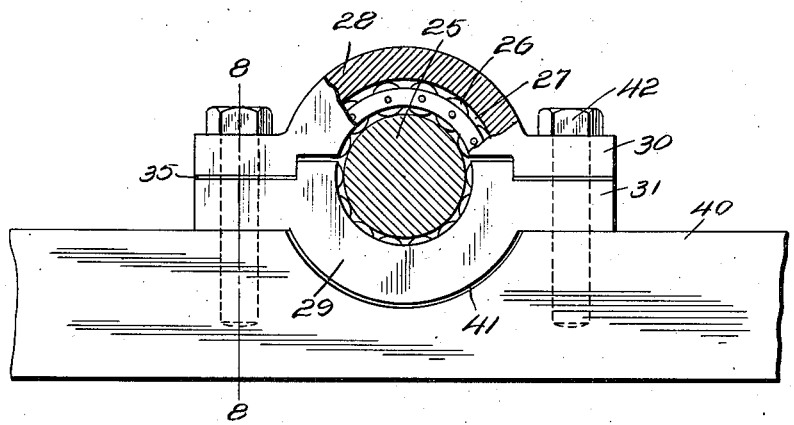
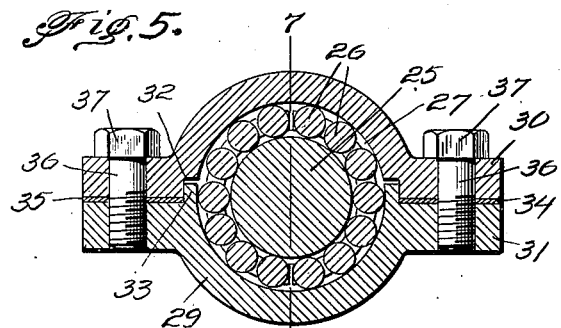
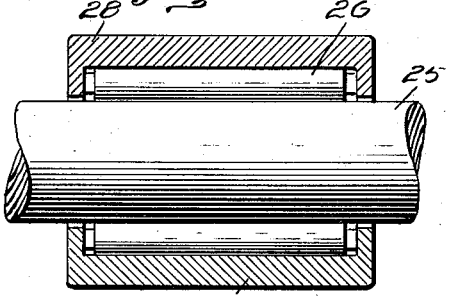
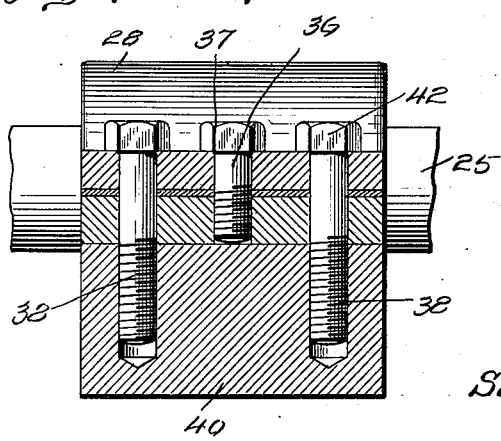
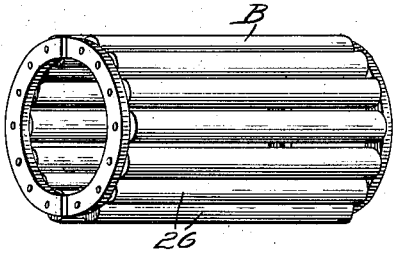
Sweney Munson. INVENTOR.
BY
*Geo. P. Kimmel* ATTORNEY.

Patented Apr. 22, 1924.

1,491,721

UNITED STATES PATENT OFFICE.

SWENEY MUNSON, OF FOWLER, COLORADO.

BEARING HOUSING.

Application filed September 14, 1920. Serial No. 410,186.

*To all whom it may concern:*

Be it known that I, SWENEY MUNSON, a citizen of the United States, residing at Fowler, in the county of Otero and State of Colorado, have invented certain new and useful Improvements in Bearing Housings, of which the following is a specification.

The invention relates to a bearing housing, and more particularly to the class of adjustable bearing housings.

The primary object of the invention is the provision of a housing of this character, wherein the same is constructed and arranged so that its sections can be adjusted relative to each other for the proper and accurate fitting of said housing about a part so that the antifriction devices interposed between the said housing and the part will be set with precision and accuracy.

Another object of the invention is the provision of a housing of this character, wherein the adjustment thereof relative to the antifriction devices and the part against which the same work, can be had prior to the setting of the housing in a piece of machinery, thereby eliminating the necessity of any adjustment of the anti-friction devices, the housing and the part against which said bearings work after the placing of these parts within the machinery and in this manner assuring the correct and minute adjustment of the bearings relative to the part prior to the setting of said housing.

A further object of the invention is the provision of a housing of this character, wherein the parts thereof can be assembled about a part in the use of the housing prior to the fitting of the part within the machinery and in this way accuracy and precision in adjustment can be had in the fitting of the housing and in the use thereof with anti-friction devices without excessive labor on the part of an artificer and thus enabling the placement of the part within the machinery expeditiously and accurately.

A still further object of the invention is the provision of a housing of this character which is extremely simple in construction, readily and easily assembled and disassembled, enabling the accurate adjustment of anti-friction devices about a part prior to the permanent setting thereof, thoroughly reliable and efficient in its purpose and inexpensive to manufacture and install.

With these objects in view and others which will be manifest and suggested as the nature and purpose of my invention are revealed in the following specification and drawing wherein I have shown a practical, yet preferred embodiment thereof.

Figure 1 is a fragmentary view of a crank shaft partly in section showing the bearings and their housings mounted thereon.

Fig. 2 is an enlarged view taken on the line 2—2 of Fig. 1.

Fig. 3 is a view taken on the line 3—3 of Fig. 2.

Fig. 4 is a view partly in section showing the housing secured to a frame or base.

Fig. 5 is a cross section of the housing and bearings removed from the frame or base.

Fig. 6 is a section taken on the line 7—7 of Fig. 5.

Fig. 7 is a section taken on the line 8—8 of Fig. 4.

Fig. 8 is a perspective view showing the split retaining ring and roller bearings.

Referring to the drawings, Figs. 1, 2 and 3 show my invention when applied to a crank shaft 1 having the usual crank arms 2 rotatable in bearings 3, said arms being connected by connecting rods 4 at their lower forked ends 5, having apertured flanges 5ª. The bearings are enclosed in a housing designated 6, anti-friction devices 7 such as roller or ball bearings B being retained in the complementary upper and lower end and side flanged sections 8, 9 which constitute said housing. The upper section 8 has a slightly cut out portion or groove 10 which receives a raised projection 11 of the lower section 9, shims 12 and 13 separating the side flanges 14, 15 of said sections as will be apparent from Fig. 2. Central apertures in the flanges 14, 15 receive adjustable cap screws 17 therein, the heads 18 of said cap screws engaging the flanges 15 of the lower section. The aperture in said flange 14 is screw threaded to receive the cap screw 17, and the flanges 15 are screw threaded to receive the securing screws. It will be observed that the central apertures extend entirely through the upper and lower sections 8, 9 and that the cap screws are on each side of the bearing which permits the sections to be adjusted relative to each other. The shims 12 and 13 may of course be replaced to suit the needs of the particular adjustment desired, which adjustment may be made by simultaneously adjusting the cap screws with the fingers or adjusting the cap screws separately.

Particular stress is placed on the fact that this adjustment is always made prior to securing the connecting rod to the housing. Obviously, it is therefore apparent that the anti-friction bearings and the housing may be adjusted with accuracy and precision at a place remote from the machinery in which the crank shaft for instance is to be installed thereby, obviating the necessity of removing the crank shaft from the machinery to make the necessary adjustments as has been heretofore practiced. Securing bolts 20, 21 on each side of the cap screws pass through aligned apertures in the flanges 5ª, 14, 15 of said housing, to connect the forked arms 5 thereto, the heads of said securing bolts engaging the flanges 5ª, said bolts being screwed into the screw threaded flanges 15, as will also be observed from Fig. 3.

Reference being now had to Figs. 4 to 8 of the drawing, I have also shown my invention when applied to a stationary supported shaft 25 provided with an anti-friction bearing 26, said shaft and bearing being retained in a housing 27. As heretofore described, the housing comprises upper and lower sections 28, 29 having apertured flanges 30, 31 the upper section being grooved at 32 to receive the raised projection 33 of the lower section. Shims 34, 35 separate the flanges 30, 31 for the obvious purpose, of securing the necessary adjustment.

The central adjusting cap screws 36 which are retained in the central apertures of the upper and lower flanged sections 30, 31 are shown with their heads 37 engaging the upper flanged section 30 and as heretofore pointed out as these cap screws are turned the respective upper and lower sections will be correspondingly adjusted. Aligned apertures in the upper and lower sections 28, 29 on each side of the adjusting screws are adapted to receive securing bolts 38, which pass through the flanges 30, 31 and are screwed into the threaded apertures of the bed or frame, which fasten the said housing to the shaft, base or frame 40 which is grooved at 41 to receive therein the lower section 29, Fig. 4. As heretofore pointed out the adjustment of the housing sections 28, 29 with respect to the anti-friction bearing is also made before the shaft is placed in its bed or frame 40. The securing bolts 38, 39 with their heads bearing against the upper section are then screwed into the bed or frame and positively securing the housing after the adjustment has been made similar to the manner described in connection with the adjustment and securing of the crank shaft.

In the accompanying drawings, I have illustrated my invention embodied in one form by way of example, and which in practice has been found to be highly satisfactory in obtaining the desired results. It will be obvious however, that other embodiments may be adopted, and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

While I have shown roller bearings, it will be obvious to those skilled in the art that ball bearings or other anti-friction devices may be used and my invention therefore is not restricted to the use of any particular anti-friction device.

I claim:

1. In combination a connecting rod having a forked end, a bearing housing formed of a pair of complementary adjustable sections adapted to embrace an anti-friction bearing and further adapted to be connected to said forked end, adjusting elements for said sections and independent of said forked end, and securing elements between said forked end and said sections, said adjusting elements being independent of said securing elements and mounted in operative position prior to the positioning of the securing elements.

2. In combination a pair of oppositely disposed semi-cylindrical sections each formed with a pair of oppositely disposed laterally extending flanges and providing a housing adapted to be arranged in embracing position with respect to an anti-friction device associated with a movable part prior to the connecting of the housing to a supporting means therefor, each of the flanges of each of said sections formed with an inner and a pair of outer openings, the walls of the inner openings of the flanges of one of said sections being threaded, headed bolts extending through the inner openings of the flanges of the other of said sections and engaging with the said threaded walls for adjustably connecting the sections in embracing position with respect to said device prior to the connecting of the housing to a supporting means therefor, and headed bolts mounted in the outer openings of the flanges of both sections for securing the sections together and to a supporting means therefor, the bolts mounted in the said outer openings being of greater length than the bolts mounted in said inner openings.

In testimony whereof, I affix my signature hereto.

SWENEY MUNSON.